(12) United States Patent
Kato et al.

(10) Patent No.: US 9,162,596 B2
(45) Date of Patent: Oct. 20, 2015

(54) SEAT SLIDE APPARATUS FOR VEHICLE

(71) Applicant: AISIN SEIKI KABUSHIKI KAISHA, Kariya-shi (JP)

(72) Inventors: Haruo Kato, Anjo (JP); Muneto Inayoshi, Nagoya (JP); Hideo Nihonmatsu, Anjo (JP); Katsusuke Araki, Nisshin (JP); Kenichi Usami, Kariya (JP); Naonori Hioki, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 176 days.

(21) Appl. No.: 13/954,374

(22) Filed: Jul. 30, 2013

(65) Prior Publication Data

US 2014/0027600 A1    Jan. 30, 2014

(30) Foreign Application Priority Data

Jul. 30, 2012   (JP) .................. 2012-168494

(51) Int. Cl.
*B60N 2/42*    (2006.01)
*B60N 2/08*    (2006.01)
*B60N 2/07*    (2006.01)

(52) U.S. Cl.
CPC ............. *B60N 2/43* (2013.01); *B60N 2/0705* (2013.01); *B60N 2/08* (2013.01); *B60N 2/0818* (2013.01); *B60N 2/0843* (2013.01); *B60N 2/42* (2013.01)

(58) Field of Classification Search
USPC ......... 248/424, 429; 296/65.01, 65.11, 65.12, 296/65.13, 65.14, 65.15, 65.18
See application file for complete search history.

(56) References Cited

U.S. PATENT DOCUMENTS

| 3,631,740 | A | * | 1/1972 | Gavagan ................ 74/527 |
| 4,238,099 | A | * | 12/1980 | Hunwicks .............. 248/430 |
| 7,735,798 | B2 | * | 6/2010 | Kojima .................. 248/429 |
| 8,550,420 | B2 | * | 10/2013 | Wojatzki et al. ......... 248/429 |
| 8,668,180 | B2 | * | 3/2014 | Shiraki .................. 248/429 |
| 2013/0076085 | A1 | * | 3/2013 | Speck et al. ............ 297/216.1 |
| 2014/0224954 | A1 | * | 8/2014 | Oh et al. ............... 248/429 |

FOREIGN PATENT DOCUMENTS

| JP | 62-42834 | 11/1987 |
| JP | 1-162827 | 11/1989 |
| JP | 2-126937 | 10/1990 |

* cited by examiner

*Primary Examiner* — Alfred J Wujciak
(74) *Attorney, Agent, or Firm* — Oblon, McClelland, Maier & Neustadt, L.L.P.

(57) ABSTRACT

A seat slide apparatus for a vehicle includes an upper rail, a lower rail, a lock mechanism including a lock lever that includes an engaging portion engageable and disengageable relative to an engaged portion formed at the lower rail, and an unlock operation inhibition apparatus including a mass member arranged at an inner void of the upper rail, a moving axis forming member forming a moving axis of the mass member, and a restriction portion inhibiting a movement of the mass member on the moving axis, the unlock operation inhibition apparatus restricting the engaging portion from moving to disengage from the engaged portion by the movement of the mass member on the moving axis to a position at which the mass member interferes with the lock lever in a case where a collision load greater than a retraining force specified for the restriction portion is input.

6 Claims, 8 Drawing Sheets

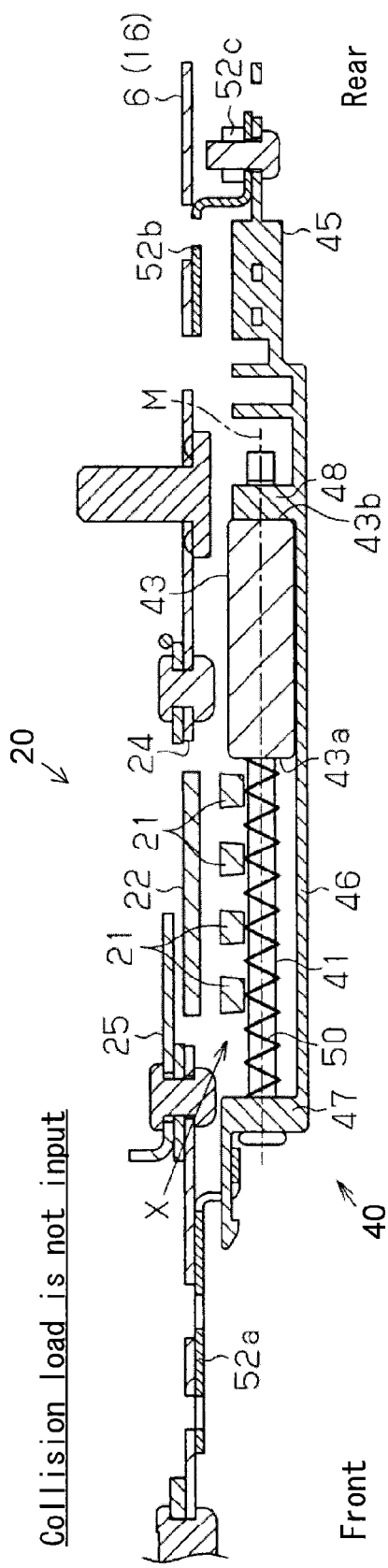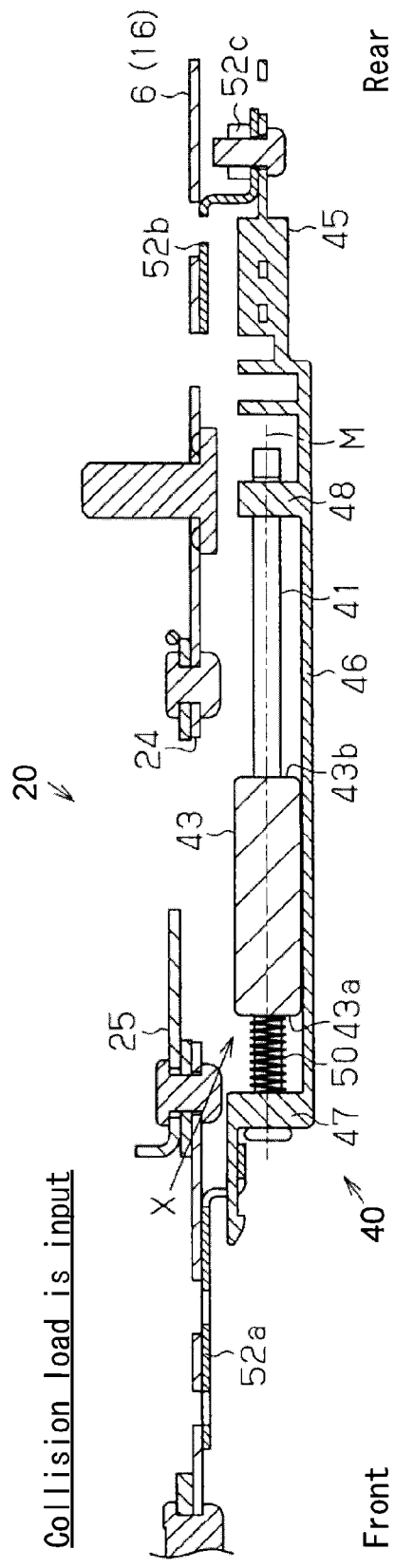

SEAT SLIDE APPARATUS FOR VEHICLE

CROSS REFERENCE TO RELATED APPLICATIONS

This application is based on and claims priority under 35 U.S.C. §119 to Japanese Patent Application 2012-168494, filed on Jul. 30, 2012, the entire content of which is incorporated herein by reference.

TECHNICAL FIELD

This disclosure generally relates to a seat slide apparatus for a vehicle.

BACKGROUND DISCUSSION

A known seat slide apparatus for a vehicle generally includes an upper rail supporting a seat at an upper side and a lower rail supporting the upper rail to be movable relatively to the lower rail. In addition, the known seat slide apparatus basically includes a lock mechanism configured to restrict a relative movement of the upper rail relative to the lower rail. Further, the known seat slide apparatus may include an unlock operation inhibition apparatus that inhibits an unlock operation of the lock mechanism caused by a collision load.

For example, JP01-162827U, which will be hereinafter referred to as Reference 1, discloses a seat slide apparatus for a vehicle including a lock mechanism that includes a projection member rotatably supported by rotation the upper rail and an engagement bore formed at the lower rail so as to restrict a relative of the upper rail relative to the lower rail by the engagement of the projection member with the engagement bore. A rotation plate corresponding to the unlock operation inhibition apparatus is provided at the lock mechanism to rotate on a basis of a collision load. The rotation of the rotation plate inhibits the rotation of the projection member to disengage from the engagement bore. JP02-126937U, which will be hereinafter referred to as Reference 2, discloses a seat slide apparatus for a vehicle including a latch plate corresponding to the aforementioned projection member in Reference 1 rotates together with an operation lever shaft pivotally supported by the upper rail. An inhibition member corresponding to the unlock operation inhibition apparatus that linearly moves on a basis of a collision load is provided to inhibit the rotation of the operation lever shaft.

According to each of the aforementioned seat slide apparatuses disclosed in References 1 and 2, a main portion of the unlock operation inhibition apparatus projects upwardly or laterally. Therefore, mountability of the unlock operation inhibition apparatus relative to a vehicle may be deteriorated. In addition, an occurrence of malfunction caused by an intrusion of foreign substance or affected by temperature change, for example, and/or a reduction in life time may occur.

A need thus exists for a seat slide apparatus for a vehicle which is not susceptible to the drawback mentioned above.

SUMMARY

According to an aspect of this disclosure, a seat slide apparatus for a vehicle includes an upper rail supporting a seat at an upper side and including an inner void extending in an extending direction of the upper rail, a lower rail supporting the upper rail to be movable relative to the lower rail, a lock mechanism configured to restrict a relative movement of the upper rail relative to the lower rail and including a lock lever, the lock lever being supported by the upper rail and including an engaging portion that moves within the inner void to be engageable and disengageable relative to an engaged portion formed at the lower rail, and an unlock operation inhibition apparatus including a mass member arranged at the inner void of the upper rail, a moving axis forming member forming a moving axis of the mass member at the inner void along the extending direction of the upper rail, and a restriction portion inhibiting a movement of the mass member on the moving axis, the unlock operation inhibition apparatus restricting the engaging portion from moving to disengage from the engaged portion by the movement of the mass member on the moving axis to a position at which the mass member interferes with the lock lever in a case where a collision load greater than a retraining force specified for the restriction portion is input.

BRIEF DESCRIPTION OF THE DRAWINGS

The foregoing and additional features and characteristics of this disclosure will become more apparent from the following detailed description considered with the reference to the accompanying drawings, wherein:

FIG. 8A is a cross-sectional view taken along line VIIIA-VIIIA in FIG. 4 in a state where a collision load is not input;

FIG. 8B is a cross-sectional view taken along line VIIIB-VIIIB in FIG. 4 in a state where a collision load is input;

DETAILED DESCRIPTION

Figure 1:
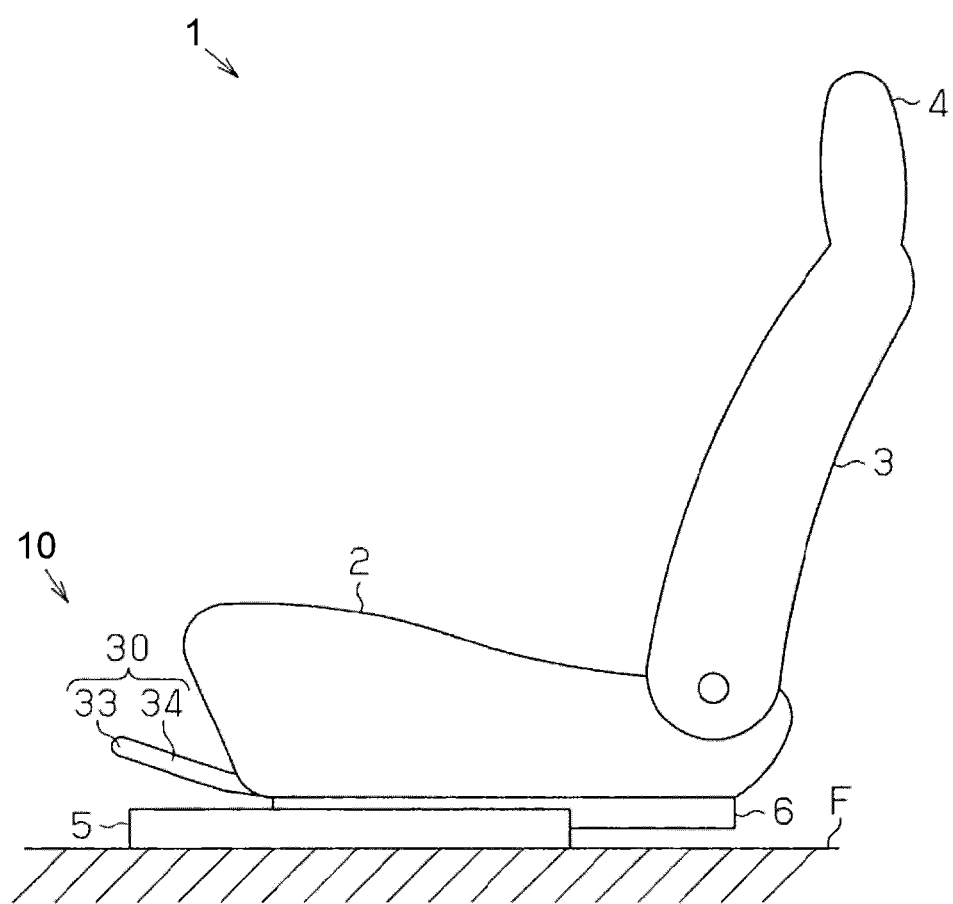
FIG. 1 is a schematic view of a seat for a vehicle at which a seat slide apparatus according to an embodiment disclosed here is mounted.

An embodiment will be explained with reference to the attached drawings. In the embodiment, directions and orientations such as left, right, front, rear, top, and bottom correspond to those when viewed from an occupant seated on a seat for a vehicle. As illustrated in FIG. 1, a seat 1 for a vehicle includes a seat cushion 2, a seatback 3 provided at a rear end portion of the seat cushion 2 so as to be tiltable relative to the seat cushion 2, and a headrest 4 arranged at an upper end portion of the seatback 3.

Figure 2:
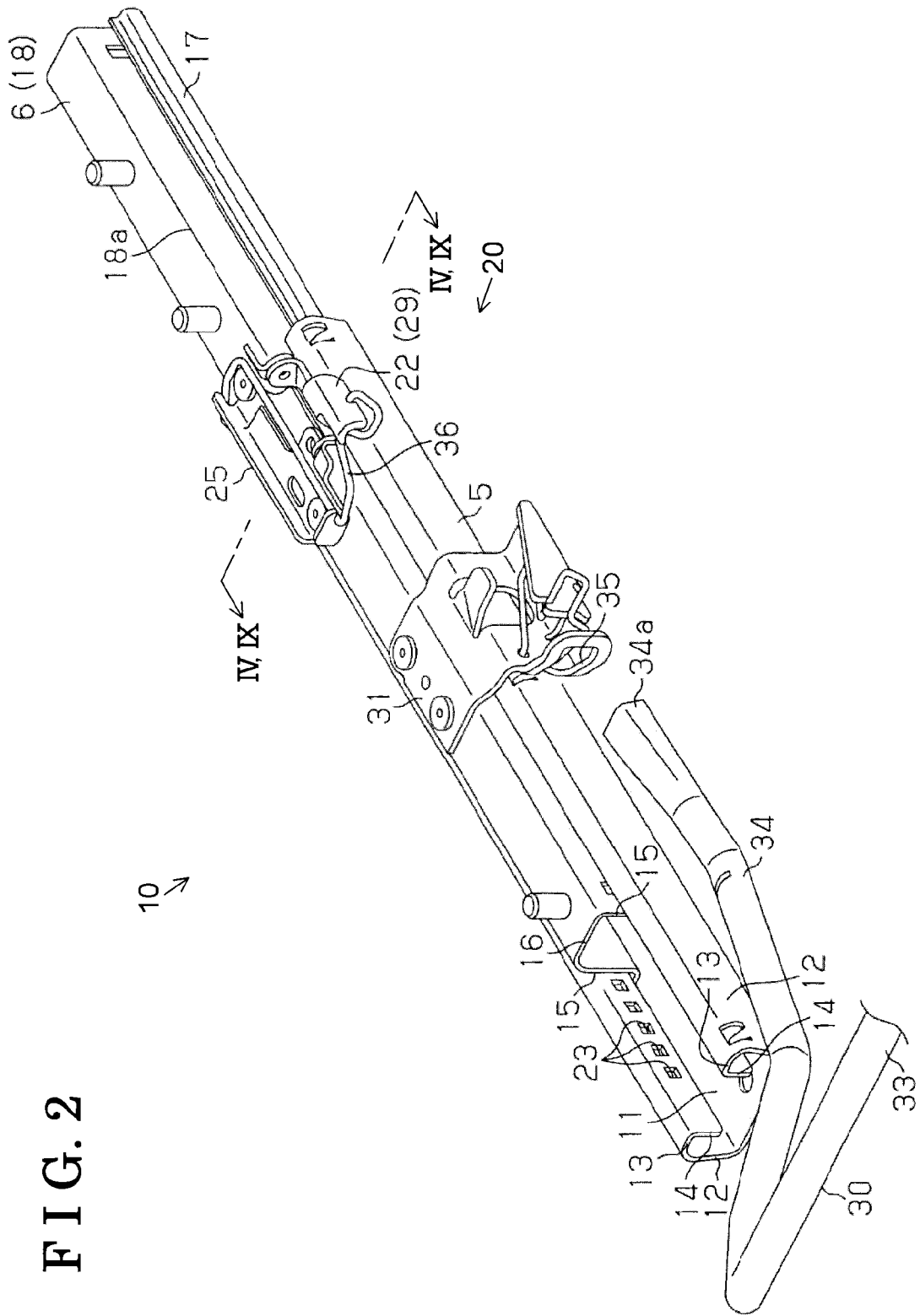
FIG. 2 is a perspective view of the seat slide apparatus according to the embodiment.
Figure 3:
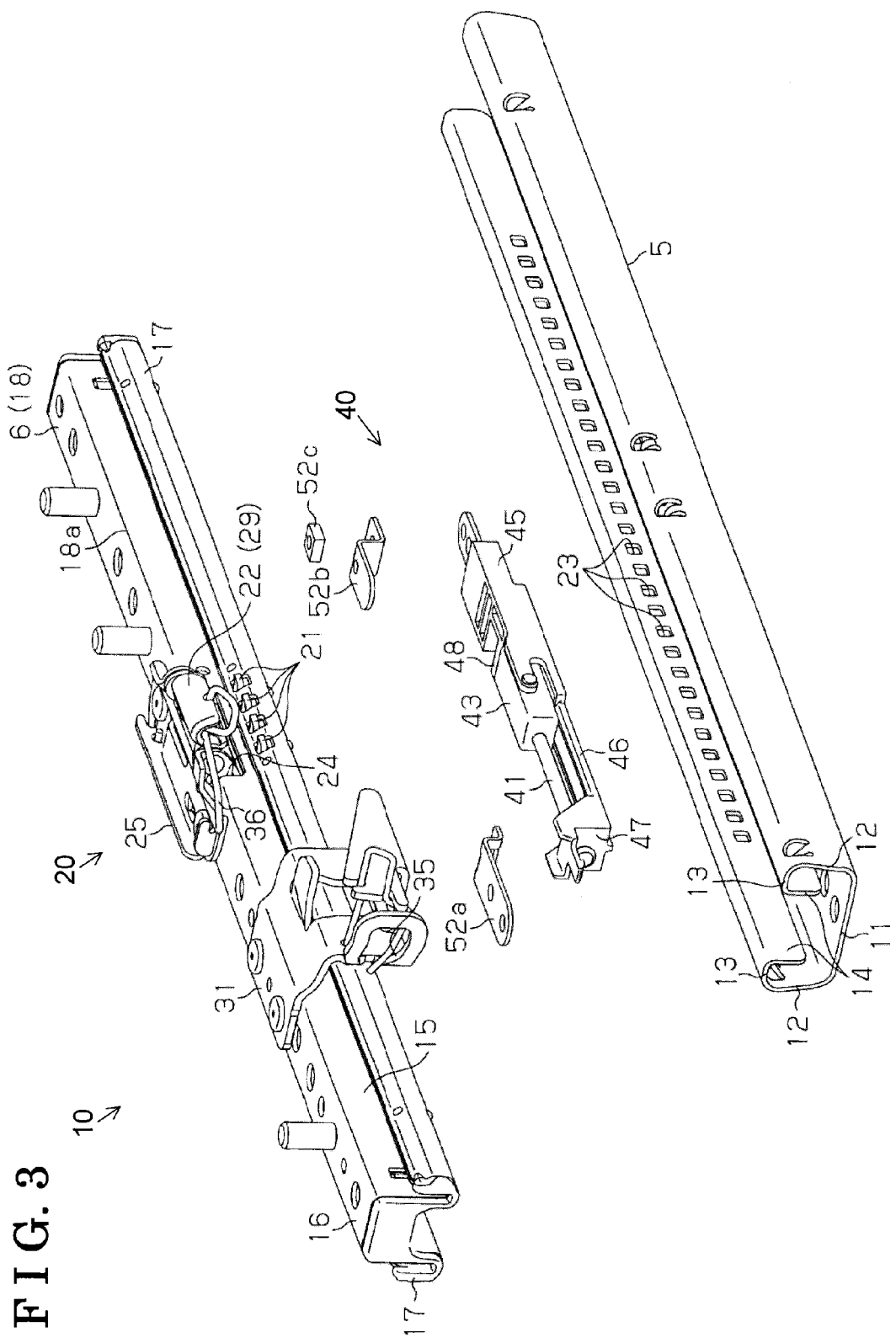
FIG. 3 is an exploded perspective view of the seat slide apparatus according to the embodiment.

A pair of lower rails 5, i.e., left and right lower rails 5, arranged substantially in parallel with each other in a width direction of the vehicle is provided at a floor portion F of the vehicle. In addition, a pair of upper rails 6, i.e., left and right upper rails 6, is arranged to be movable relative to the pair of lower rails 5. In FIGS. 2 and 3, one of the lower rails 5 and one of the upper rails 6, specifically, the right lower rail 5 and the right upper rail 6 are illustrated. The seat cushion 2 of the seat 1 is supported onto the upper rails 6.

According to the embodiment, the lower rails 5 and the upper rails 6 movable relative to the lower rails 5 constitute a seat slide apparatus 10. An occupant of the vehicle uses a function of the seat slide apparatus 10 for adjusting a position of the seat 1 in a longitudinal direction of the vehicle (i.e., right and left directions in FIG. 1).

Figure 4:
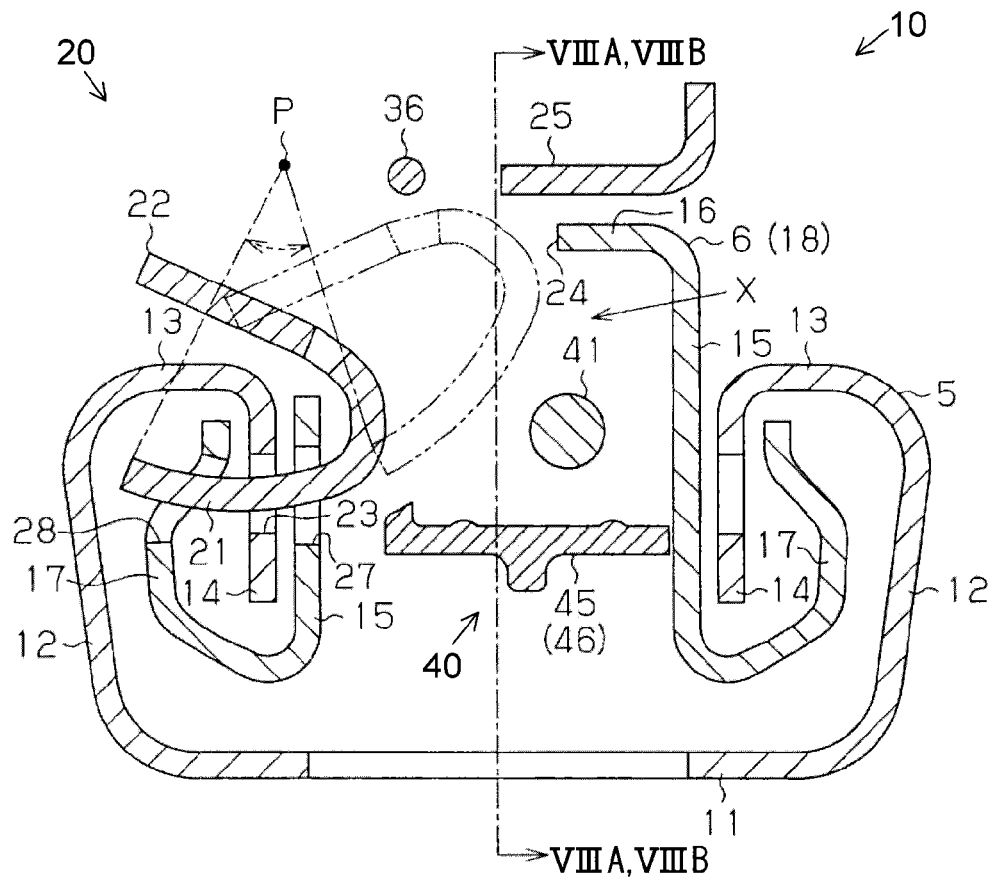
FIG. 4 is a cross-sectional view taken along line IV-IV in FIGS. 2 and 5.

Specifically, as illustrated in FIGS. 3 and 4, each of the lower rails 5 includes a bottom wall portion 11 including a flat plate form serving as a fixation portion fixed to the floor portion F. Outer wall portions 12 are formed at respective edges of the bottom wall portion 11 in the width direction (i.e., in right and left directions in FIG. 4). An upper wall portion 13 including a flange form is formed at an upper edge of each of the outer wall portions 12 so as to extend inwardly in the width direction. A folding portion 14 is formed at an edge of each of the upper wall portions 13 to be bent downwardly.

Each of the upper rails 6 includes a pair of side wall portions 15 arranged to oppose in the width direction. Upper ends of the side wall portions 15 are connected to each other via an upper wall portion 16 including a plate form. A folding portion 17 is formed at a lower end of each of the side wall portions 15 to be bent outwardly in the width direction and then upwardly.

The upper rail 6 is attached to the lower rail 5 in a state where a main portion 18 of the upper rail 6 constituted by the pair of side wall portions 15 and the upper wall portion 16 formed in a substantially U-shape in a cross section is arranged between the folding portions 14 of the lower rail 5. Each of the folding portions 17 of the upper rail 6 is arranged along the outer wall portion 12 of the lower rail 5 facing in the width direction so as to extend upwardly from the lower end of each of the side wall portions 15. Plural rollers each formed in a ball are disposed between each of the folding portions 17 of the upper rail 6 and each of the outer wall portions 12 of the lower rail 5. According to the seat slide apparatus 10 of the embodiment, rollers are rolled to ensure a smooth relative movement between the lower rail 5 and the upper rail 6 in the extending direction.

The seat slide apparatus 10 also includes a lock mechanism 20 configured to restrict the relative movement between the lower rail 5 and the upper rail 6. Specifically, as illustrated in FIGS. 3 and 4, a lock lever 22 is provided at each of the upper rails 6 in a state to be rotatably supported by the upper rail 6. The lock lever 22 includes engagement projections 21 at a first end. Each of the engagement projections 21 serving as an engaging portion is formed in a comb teeth form. In addition, plural engagement bores 23 are formed on a line at the lower rail 5 in the extending direction thereof. The engagement bores 23 are engageable with the engagement projections 21 of the lock lever 22. According to the lock mechanism 20 of the embodiment, the engagement projections 21 of the lock lever 22 engage with or disengages from the engagement bores 23 so that a locked state in which the relative movement between the lower rails 5 and the upper rails 6 is restricted and an unlocked state in which the relative movement is allowed are switchable.

Specifically, an attachment bore 24 is formed at the upper rail 6 by a cut-off of one of corner portions 18a of the main portion 18 formed in a U-shape in a cross-section. The lock lever 22 is inserted into the attachment bore 24 in a state where the engagement projections 21 of the lock lever 22 are arranged within an inner void X of the upper rail 6, the inner void X being formed by the main portion 18 formed in a U-shape. A support member 25 is attached to the upper wall portion 16 of the upper rail 6 so as to rotatably support the lock lever 22 inserted into the attachment bore 24.

Specifically, the support member 25 supports the lock lever 22 by sandwiching or holding the lock lever 22 at two points separated in the extending direction of the upper rail 6 to thereby form a pivot support point P serving as an operation supporting point positioned along the extending direction of the upper rail 6. The lock lever 22 is rotated about the pivot support point P so that the engagement projections 21 provided at the first end of the lock lever 22 move within the inner void X of the upper rail 6 in a direction perpendicular to the extending direction of the upper rail 6.

According to the embodiment, the engagement projections 21 of the lock lever 22 are formed by a bending of an end portion of a plate member that constitutes the lock lever 22 in a substantially U-shape. In addition, plural penetration bores 27 are formed at the side wall portion 15 of the upper rail 6 (i.e., the side wall portion 15 at a left side in FIG. 4) to be positioned at a lower side of the attachment bore 24 so that the engagement projections 21 of the lock lever 22 may be inserted into the respective penetration bores 27. According to the present embodiment, plural penetration bores 28 similar to the penetration bores 27 are formed at the folding portion 17 of the upper rail 6 at the substantially same position in a vertical direction as the penetration bores 27. In a state where the upper rail 6 is attached to the lower rail 5, the engagement bores 23 are formed at the folding portion 14 of the lower rail 5 positioned at an outer side of the side wall portion 15 in the width direction (i.e., right and left directions in FIG. 4).

In association with the rotation of the lock lever 22, the engagement projections 21 move in a direction perpendicular to the side wall portion 15 at which the attachment bore 24 is formed. The engagement projections 21 engage with or disengage from the engagement bores 23 of the lower rail 5 via the penetration bores 27.

Figure 5:
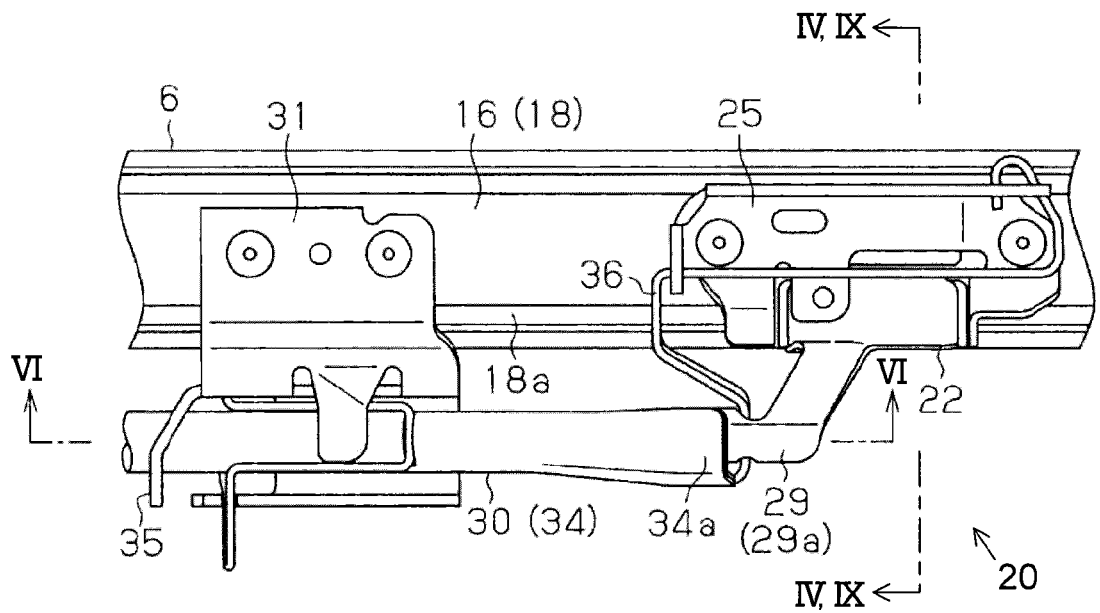
FIG. 5 is a plan view illustrating a vicinity of a lock mechanism of the seat slide apparatus.

As illustrated in FIGS. 2, 3, and 5, an operation input portion 29 is formed at a second end of the lock lever 22 projecting laterally from the attachment bore 24 of the upper rail 6. The operation input portion 29 operates and rotates the lock lever 22 about the pivot support point P formed by the support member 25. An operation lever support member 31 is provided at the upper rail 6 to support an operation lever 30 that operates the operation input portion 29.

Specifically, as illustrated in FIGS. 1, 2, and 5, the operation lever 30 includes an operation portion 33 arranged at a front side of the seat 1 along the width direction of the seat 1 (i.e., in a direction perpendicular to the plane of the paper of FIG. 1) and lever portions 34 connected to the operation portion 33 and extending along the left lower and upper rails 5 and 6 and the right lower and upper rails 5 and 6 respectively. The operation lever support member 31 includes a support bore 35 at a lateral side of the upper rail 6 (i.e., at a lower side in FIG. 5) at which the operation input portion 29 of the lock lever 22 projects. The lever portion 34 of the operation lever 30 is inserted into the support bore 35. The operation lever support member 31 is configured to support the operation lever 30 while allowing a tilting of the lever portion 34 relative to the support bore 35.

According to the present embodiment, the lock lever 22 is provided at each of the left and right upper rails 6. The operation lever 30 is formed in a substantially U-shape by a folding of a tube material while including the pair of lever portions 34 corresponding to the left and right upper rails 6.

The operation lever support member 31 is also provided at each of the left and right upper rails 6.

According to the present embodiment, the lock lever 22 is biased to rotate in a direction in which the operation input portion 29 that projects to the lateral side of the upper rail 6 is lifted upward by an elastic force of a spring member 36 provided at the support member 25. An end portion 34a of each of the lever portions 34 of the operation lever 30 is in contact with an upper surface 29a of the operation input portion 29.

Figure 6:
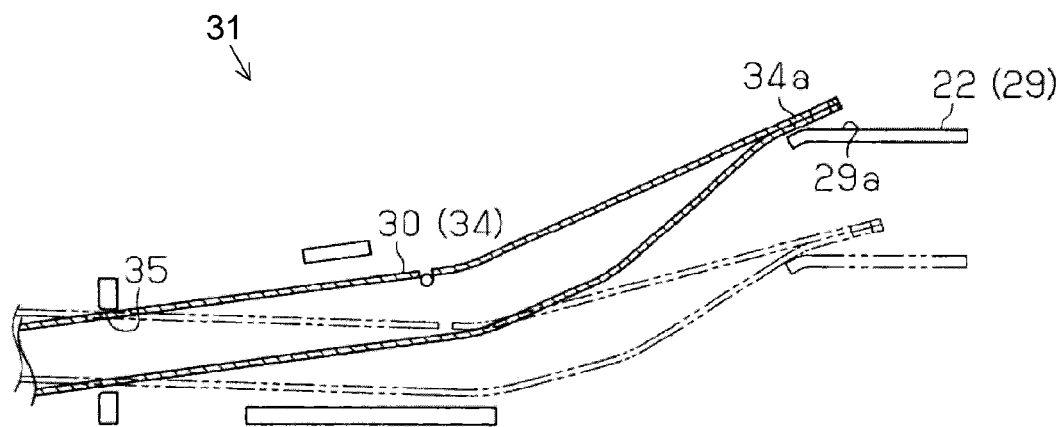
FIG. 6 is a diagram illustrating an operation of the lock mechanism (cross-sectional view taken along line VI-VI in FIG. 5)

As illustrated in FIGS. 2 and 6, in a state where the operation portion 33 is operated to be lifted upward, the end portion 34a of each of the lever portions 34 is tilted downward (i.e., to a lower side in FIG. 6) relative to the support bore 35 of the operation lever support member 31. As a result, the operation input portion 29 of the lock lever 22 is pushed downward (i.e., pushed to a position illustrated by a chain double-dashed line in FIG. 6) so as to obtain the unlocked state of the lock mechanism 20.

Specifically, as illustrated in FIG. 4, in a state where the operation lever 30 is not operated, the lock lever 22 rotates on a basis of the elastic force of the spring member 36 so that the engagement projections 21 provided at the first end of the lock lever 22 are inserted into the respective engagement bores 23 formed at the lower rail 5 via the penetration bores 27 formed at the side wall portion 15 of the upper rail 6. According to the present embodiment, end portions of the engagement projections 21 are inserted into the respective penetration bores 28 formed at the folding portion 17 of the upper rail 6. As a result, the lock mechanism 20 of the present embodiment is configured to be brought to the locked state in which the relative movement between the lower rails 5 and the upper rails 6 is restricted.

On the other hand, in a case where the operation lever 30 is operated, the lock lever 22 rotates in a direction in which the engagement projections 21 disengage from the engagement bores 23 formed at the lower rail 5 and the penetration bores 27 and 28 formed at the upper rail 6 (i.e., rotates to a position illustrated by a chain double-dashed line in FIG. 4). As a result, the lock mechanism 20 of the present embodiment is configured to be brought to the unlocked state in which the relative movement between the lower rails 5 and the upper rails 6 is allowed by the release of the engagement between the engagement projections 21 serving as the engaging portion and the engagement bores 23 serving as an engaged portion.

Next, a structure for inhibiting an unlock operation of the lock mechanism 20 in a case where a collision load is input (an unlock operation inhibition structure) according to the seat slide apparatus 10 of the present embodiment will be explained.

As illustrated in FIGS. 3, 7, 8A, 8B, and 9, the seat slide apparatus 10 of the present embodiment includes an unlock operation inhibition apparatus 40 for inhibiting the unlock operation of the lock mechanism 20 caused by a collision load that occurs at a time of a vehicle collision.

Specifically, the unlock operation inhibition apparatus 40 includes a shaft member 41 arranged at the inner void X of the upper rail 6 so as to extend in the extending direction of the upper rail 6, and a mass member 43 arranged at the inner void X and including a penetration bore 42 into which the shaft member 41 is inserted.

According to the present embodiment, the shaft member 41 extends from a position at a front side of the attachment bore 24 (at a left side in FIG. 8) to a position at a rear side of the attachment bore 24 (at a right side in FIG. 8) within the inner void X of the upper rail 6 that extends in a direction substantially same as the longitudinal direction of the vehicle. The mass member 43 according to the present embodiment is constituted by a block body (a solid body) in an elongated form and a substantially rectangular solid form. The penetration bore 42 penetrates through the mass member 43 in a longitudinal direction thereof. The mass member 43 is movable on a moving axis M (see FIGS. 8A and 8B) formed by the shaft member 41 at the inner void X of the upper rail 6.

Specifically, the unlock operation inhibition apparatus 40 includes a case 45 integrally holding the shaft member 41 serving as a moving axis forming member and the mass member 43. The case 45 includes a bottom plate portion 46 having an elongated form and a substantially flat plate form, and a pair of side wall portions 47 and 48, i.e., a first side wall portion 47 and a second side wall portion 48, arranged separately from each other in a longitudinal direction of the bottom plate portion 46 in a projecting manner relative to the bottom plate portion 46. Insertion bores 49 are formed at respective positions of the first and second side wall portions 47 and 48 facing each other. The shaft member 41 is held by the case 45 in a state where opposing end portions of the shaft member 41 are inserted into the insertion bores 49 of the first and second side wall portions 47 and 48 respectively so that the shaft member 41 bridges across the first and second side wall portions 47 and 48.

The bottom plate portion 46 of the case 45 is attached to the upper rail 6 so as to be positioned in parallel to the upper wall portion 16 of the upper rail 6 in a state where the first side wall portion 47 is arranged at a front side while the second side wall portion 48 is arranged at a rear side. Consequently, the shaft member 41 and the mass member 43 held by the case 45 are arranged along the extending direction of the upper rail 6.

As illustrated in FIGS. 8A and 8B, a coil spring 50 is provided at a front side of the mass member 43. The coil spring 50 is attached to the shaft member 41 in a state where a first end of the coil spring 50 makes contact with the first side wall portion 47 at the front side in the case 45 while a second end of the coil spring 50 makes contact with a front end portion 43a of the mass member 43. The mass member 43 is biased by the coil spring 50 serving as an elastic portion constituting a biasing portion so that the mass member 43 is arranged within the inner void X in a state where a rear end portion 43b of the mass member 43 is in contact with the second side wall portion 48 at the rear side in the case 45.

Figure 7:
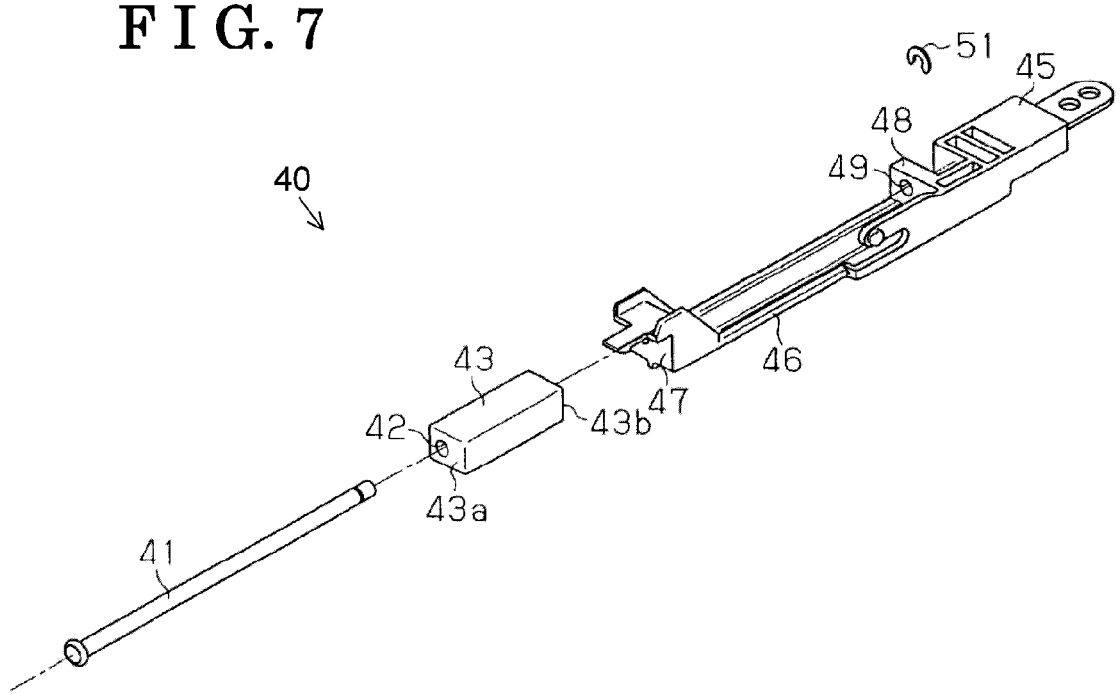
FIG. 7 is an exploded perspective view of an unlock operation inhibition apparatus of the seat slide apparatus according to the embodiment.

The illustration of the coil spring 50 is omitted in FIGS. 3, 4, and 7 for convenience. A fixing member 51 illustrated in FIG. 7 is fitted to one end of the shaft member 41 that is inserted into the insertion bore 49 at the second side wall portion 48 to restrict the axial movement of the shaft member 41. The case 45 is fixed to the upper wall portion 16 of the upper rail 6 by means of fixation members 52a, 52b, and 52c illustrated in FIG. 3. As a result, according to the present embodiment, the shaft member 41, the mass member 43, and the coil spring 50 may be integrally attached to the upper rail 6.

As illustrated in FIG. 8A, the case 45 is formed so that, in a state where the rear end portion 43b of the mass member 43 is in contact with the second side wall portion 48, the mass member 43 is arranged at a position at which the mass member 43 is inhibited from interfering with the lock lever 22, specifically, at a relatively rear position at which the front end portion 43a of the mass member 43 is inhibited from interfering with the engagement projections 21 moving within the inner void X in association with the rotation of the lock lever 22.

In a case where the collision load is not input as illustrated in FIG. 8A, the mass member 43 is inhibited from moving on the moving axis M by the elastic force of the coil spring 50 serving as a restriction portion. Therefore, the movement of the engagement projections 21 within the inner void X, i.e., engagement and disengagement of the engagement projections 21 relative to the engagement bores 23 formed at the lower rail 5, in association with the rotation of the lock lever 22 is ensured. In FIG. 8A, the lock lever 22 rotated to a position corresponding to the unlocked state (see FIG. 4, a position illustrated by a chain double-dashed line in FIG. 4) is illustrated.

The elastic force of the coil spring 50 is specified so that the mass member 43 moves forward against the elastic force of the coil spring 50 on the moving axis M to a position at which the mass member 43 interferes with the lock lever 22 as illustrated in FIG. 8B in a case where the collision load greater than a predetermined value is input from a front side of the vehicle. The unlock operation inhibition apparatus 40 is thus configured to inhibit the unlock operation of the lock mechanism 20 by the collision load.

Operations of the unlock operation inhibition apparatus 40 configured in the aforementioned manner will be explained below. The mass member 43 intends to move forward on the moving axis M by inertia because of the collision load input from the front side of the vehicle. Then, as illustrated in FIG. 8B, in a case where the collision load exceeds a restraining force (elastic force) specified beforehand for the coil spring 50, the mass member 43 moves forward on the moving axis M to a position at which the lock lever 22 interferes with the lock lever 22.

Figure 9:
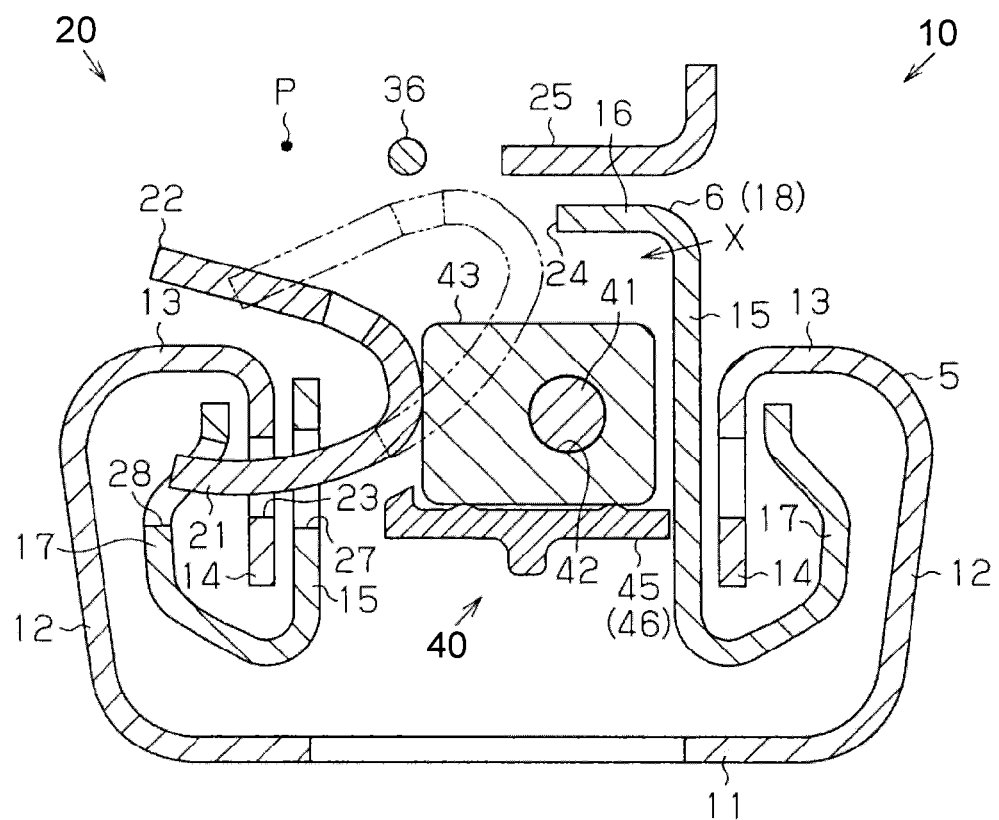
FIG. 9 is a cross-sectional view taken along line IX-IX in FIGS. 2 and 5 in a case where a mass moves forward.

Specifically, as illustrated in FIG. 9, the mass member 43 that moves forward by the input of the collision load is arranged at a position at which the engagement projections 21 that disengage from the engagement bores 23 of the lower rail 5 originally move to be positioned in the inner void X (i.e., a position illustrated by a chain double-dashed line in FIG. 9). As a result, the mass member 43 makes contact with the lock lever 22 that intends to rotate in a direction in which the engagement projections 21 disengage from the engagement bores 23 of the lower rail 5 by the collision load. More specifically, the mass member 43 makes contact between the pivot support point P and the engagement projections 21 of the lock lever 22. Therefore, the unlock operation of the lock mechanism 20 caused by the collision load is inhibited.

In addition, because of the forward movement of the mass member 43 by the input of the collision load, the coil spring 50 biasing the mass member 43 rearward is compressed. Then, in a case where the mass member 43 returns to a normal position on a basis of the elastic force of the coil spring 50, i.e., the mass member 43 returns to a state where the rear end portion 43b of the mass member 43 makes contact with the second side wall portion 48 of the case 45 as illustrated in FIG. 8A, the lock mechanism 20 may perform the unlock operation on a basis of an operation input of the operation lever 30 after the vehicle collision.

According to the aforementioned embodiment, the unlock operation inhibition apparatus 40 includes the mass member 43 arranged within the inner void X of the upper rail 6 and the shaft member 41 forming the moving axis M of the mass member 43 in the extending direction of the upper rail 6. In addition, the unlock operation inhibition apparatus 40 includes the coil spring 50 serving as the biasing portion and the restriction portion inhibiting the movement of the mass member 43 on the moving axis M by biasing the mass member 43 rearward on a basis of the elastic force at a position at which the mass member 43 is inhibited from interfering with the lock lever 22 of the lock mechanism 20. The elastic force of the coil spring 50 is specified so that the mass member 43 moves forward against the elastic force of the coil spring 50 on the moving axis M to a position at which the mass member 43 interferes with the lock lever 22 in a case where the collision load greater than the predetermined value (the restraining force) is input from the front side of the vehicle.

According to the aforementioned configuration, in a case where the collision load exceeding the restraining force that is specified beforehand on a basis of the elastic force of the coil spring 50 is input, the mass member 43 moves by inertia on the moving axis M to the position at which the mass member 43 interferes with the lock lever 22. As a result, the movement of the engagement projections 21 is restricted, i.e., the disengagement of the engagement projections 21 from the engagement bores 23 of the lower rail 5 is restricted, so as to inhibit the unlock operation of the lock mechanism 20 caused by the collision load.

In addition, the unlock operation inhibition apparatus 40 is arranged within the inner void X of the upper rail 6 surrounded by wall portions (i.e., substantially U-shaped portion formed by the side wall portions 15 and the upper wall portion 16) constituting the upper rail 6. Thus, mountability of the seat slide apparatus 10 to the vehicle is enhanced. A possibility of an occurrence of malfunction and a reduction of life time caused by intrusion of foreign materials such as dust and dirt, for example, and temperature change may be reduced. Further, because the mass member 43 moves on the moving axis M along the extending direction of the upper rail 6 that substantially matches the longitudinal direction of the vehicle, the restraining force of the coil spring 50 may be accurately specified on a basis of the elastic force of the coil spring 50, i.e., a magnitude of collision load based on which the mass member 43 moves to the position at which the mass member 43 interferes with the lock lever 22 may be accurately specified. Furthermore, timing difference between the input of collision load and the movement of the mass member 43 may be restrained. As a result, further improved operation characteristics may be obtained. Because the mass member 43 directly interferes with the lock lever 22, the unlock operation caused by the collision load may be securely inhibited.

The coil spring 50 biasing the mass member 43 rearward is compressed by the forward movement of the mass member 43. Then, the mass member 43 returns to the normal position on a basis of the elastic force of the coil spring 50 that biases the mass member 43 in a direction opposite from the moving direction of the mass member 43 based on the collision load. As a result, after the vehicle collision, the lock mechanism 20 may perform the unlock operation based on the operation input of the operation lever 30 in the same way before the vehicle collision.

The mass member 43 makes contact between the pivot support point P and the engagement projections 21 of the lock lever 22. Thus, the movement of the engagement projections 21, i.e., the disengagement of the engagement projections 21 from the engagement bores 23 of the lower rail 5, may be directly restricted. As a result, the unlock operation caused by the collision load may be further securely inhibited.

The mass member 43 is formed by a block body in an elongated form and a substantially rectangular solid form. In addition, the penetration bore 42 is formed at the mass member 43 along the longitudinal direction thereof. The shaft member 41 is inserted into the penetration bore 42 so that the mass member 43 is arranged at the inner void X of the upper rail 6 to be movable on the moving axis M that is formed by the shaft member 41.

According to the aforementioned configuration, the moving axis M of the mass member 43 along the extending direction of the upper rail 6 may be easily formed at the inner void X of the upper rail 6 by a simple structure. In addition, an outer peripheral surface of the shaft member 41 makes contact with an inner peripheral surface of the penetration bore 42 to form the moving axis M to thereby ensure a stable movement of the mass member 43. Specifically, a contact surface formed at the mass member 43 relative to the shaft member 41 spreads and extends in a direction along the moving axis M, thereby inhibiting the mass member 43 from tilting. As a result, an increase of frictional resistance caused by a generation of pressure angle may be restrained. A smooth movement of the mass member 43 is therefore assured.

The unlock operation inhibition apparatus 40 includes the case 45 serving as a holding member integrally holding the shaft member 41, the mass member 43, and the coil spring 50. Therefore, the shaft member 41, the mass member 43, and the coil spring 50 may be integrally attached to the upper rail 6 as a single unit. An assembly operation of the unlock operation inhibition apparatus 40 may be effectively performed accordingly.

The aforementioned embodiment may be modified as follows. According to the aforementioned embodiment, the lock lever 22 is provided at each of the left and right upper rails 6. In addition, the unlock operation inhibition apparatus 40 is provided at each of the left and right upper rails 6. At this time, however, as long as the lock lever 22 is provided at either of the left and right upper rails 6 and at least one unlock operation inhibition apparatus 40 is provided for restricting the operation of the aforementioned lock lever 22, the number of lock levers 22 and the unlock operation inhibition apparatuses 40 may be changed.

According to the aforementioned embodiment, the lock lever 22 is supported by the upper rail 6 in a state where the end portion of the lock lever 22, i.e., the engagement projections 21, moves in a direction perpendicular to the side wall portion 15 when the lock lever 22 rotates. Alternatively, the end portion of the lock lever 22 may move in a direction perpendicular to the upper wall portion 16 of the upper rail 6.

In addition, according to the aforementioned embodiment, the lock lever 22 rotates about the pivot support point P so that the engagement projections 21 engage with or disengage from the engagement bores 23 of the lower rail 5. At this time, however, the lock lever 22 may not necessarily rotate. That is, the lock lever 22 may perform a swing operation by including an operation supporting point similar to the pivot support point P. Alternatively, the lock lever 22 may perform a parallel displacement.

Further, according to the aforementioned embodiment, the engagement projections 21 serving as the engaging portion is provided at the lock lever 22 and the engagement bores 23 serving as the engaged portion is provided at the lower rail 5. Alternatively, the engaging portion may include a recess form (including a bore) and the engaged portion may include a protruding form.

Furthermore, according to the aforementioned embodiment, the mass member 43 is arranged at the inner void X of the upper rail 6 to be movable on the moving axis M that is formed by the shaft member 41 in a state where the shaft member 41 is inserted into the penetration bore 42. Alternatively, a structure except for the shaft member 41 may serve as the moving axis forming member for forming the moving axis M of the mass member 43 at the inner void X of the upper rail 6.

Figure 10A:
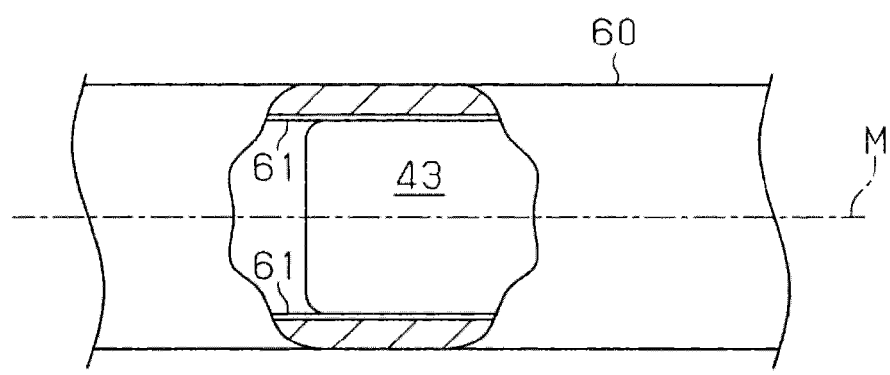
FIG. 10A is a side view of a schematic configuration of a moving axis forming member according to another embodiment disclosed here.
Figure 10B:
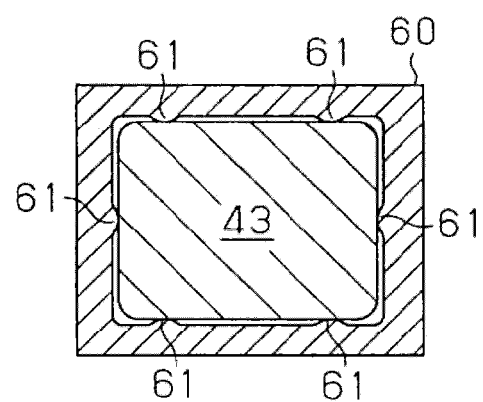
FIG. 10B is a cross-sectional view of the schematic configuration of the moving axis forming member according to another embodiment.

For example, as illustrated in FIG. 10A, a tubular member 60 surrounding the outer periphery of the mass member 43 may serve as the moving axis forming member forming the moving axis M of the mass member 43. In this case, projection portions 61 projecting along an extending direction of the tubular member 60, i.e., along the moving axis M formed by the tubular member 60, may be provided at an inner peripheral surface of the tubular member 60. As a result, a frictional resistance caused by a contact between the outer periphery of the mass member 43 and the inner periphery of the tubular member 60 may be reduced to ensure a smooth movement of the mass member 43.

The shape of the mass member 43 may be appropriately changed. For example, the mass member 43 may be formed in a column including a polygon except for a square in a cross section, a cylindrical form, or a hollow form. In addition, the longitudinal direction of the mass member 43 may not be necessarily arranged along the moving axis M. In such case, however, the contact surface formed at the mass member 43 relative to the moving axis forming member may desirably spread and extend along the moving axis M. In the same way as the aforementioned embodiment, a length of the contact surface at the mass member 43 relative to the moving axis forming member (the shaft member 41) along the moving axis M may be desirably longer than a diameter of a portion forming the contact surface at the moving axis forming member (i.e., an outer diameter of the shaft member 41), the contact surface at the mass member 43 corresponding to the inner peripheral surface of the penetration bore 42 while the contact surface at the moving axis forming member corresponding to the outer peripheral surface of the shaft member 41. Accordingly, the mass member 43 is restrained from tilting to ensure the smooth movement of the mass member 43.

Furthermore, according to the aforementioned embodiment, the shaft member 41 is arranged at the inner void X of the upper rail 6 along the extending direction of the upper rail 6 that substantially matches the longitudinal direction of the vehicle. Alternatively, the extending direction of the shaft member 41 does not necessarily match the extending direction of the upper rail 6 and may slightly deviate from the extending direction of the upper rail 6.

That is, during an actual operation, the unlock operation inhibition apparatus 40 arranged in a direction that matches the extending direction of the upper rail 6 may interfere with the other structure provided at the inner void X of the upper rail 6. In addition, the upper rail 6 or the lower rail 5 may include a slight curving form. Accordingly, in such case, the unlock operation inhibition apparatus 40 may be arranged so that the extending direction of the shaft member 41 may slightly incline relative to the extending direction of the upper rail 6.

Furthermore, according to the aforementioned embodiment, the coil spring 50 serving as the biasing portion is used to constitute the restriction portion. Alternatively, the restriction portion may be constituted by the other elastic member serving as the biasing portion. Further alternatively, the elastic member as the biasing portion may not be used, for example, the restriction portion may be formed by the engaging portion and the engaged portion which disengage from each other due to the input of collision load.

According to the aforementioned embodiment, the moving axis forming member (the shaft member 41) forms the moving axis M by contacting with the mass member 43. The length of the contact surface at the mass member 43 along the moving axis M relative to the moving axis forming member (the shaft member 41) is greater than the diameter of the portion forming the contact surface at the moving axis forming member (the shaft member 41). As a result, the mass member 43 is restrained from tilting to ensure the smooth movement of the mass member 43.

According to the aforementioned embodiment, the seat slide apparatus 10 including an improved mountability to the vehicle and securely inhibiting the unlock operation of the lock mechanism 20 caused by the collision load may be obtained.

According to the aforementioned embodiment, the movement of the engagement projections 21 is restricted, i.e., the disengagement of the engagement projections 21 from the engagement bores 23 is restricted, so as to inhibit the unlock operation of the lock mechanism 20 caused by the collision load. In addition, because the unlock operation inhibition apparatus 40 is arranged within the inner void X of the upper rail 6, mountability of the seat slide apparatus 10 to the vehicle is enhanced. A possibility of an occurrence of malfunction and a reduction of life time caused by intrusion of foreign materials such as dust and dirt, for example, and temperature change may be reduced. Further, because the mass member 43 moves on the moving axis M along the extending direction of the upper rail 6 that substantially matches the longitudinal direction of the vehicle, the restraining force of the coil spring 50, i.e., a magnitude of collision load based on which the mass member 43 moves to the position at which the mass member 43 interferes with the lock lever 22, may be accurately specified. Furthermore, timing difference between the input of collision load and the movement of the mass member 43 may be restrained. As a result, further improved operation characteristics may be obtained. Because the mass member 43 directly interferes with the lock lever 22, the unlock operation caused by the collision load may be securely inhibited.

According to the aforementioned embodiment, the lock lever 22 is supported by the upper rail 6 in a state where the engagement projections 21 move within the inner void X relative to the pivot support point P, and the mass member 43 makes contact between the pivot support point P and the engagement projections 21 of the lock lever 22 to restrict the engagement projections 21 from moving to disengage from the engagement bores 23.

Thus, the movement of the engagement projections 21, i.e., the disengagement of the engagement projections 21 from the engagement bores 23 of the lower rail 5, may be directly restricted. As a result, the unlock operation caused by the collision load may be further securely inhibited.

According to the aforementioned embodiment, the moving axis forming member is the shaft member 41 extending in the extending direction of the upper rail 6, and the mass member 43 includes the penetration bore 42 into which the shaft member 41 is inserted.

Accordingly, the moving axis M of the mass member 43 along the extending direction of the upper rail 6 may be easily formed at the inner void X of the upper rail 6 by a simple structure. In addition, a stable movement of the mass member 43 may be assured.

According to the aforementioned embodiment, the shaft member 41 forms the moving axis M by contacting with the mass member 43, and the contact surface formed at the mass member 43 spreads in a direction along the moving axis M.

Accordingly, a stable movement of the mass member 43 may be assured. In addition, because the contact surface formed at the mass member 43 relative to the shaft member 41 spreads and extends in a direction along the moving axis M, the mass member 43 may be inhibited from tilting. As a result, an increase of frictional resistance caused by a generation of pressure angle may be restrained. A smooth movement of the mass member 43 is therefore assured.

According to the aforementioned embodiment, the unlock operation inhibition apparatus 40 includes the case 45 configured to integrally assemble the mass member 43, the shaft member 41, and the coil spring 50 relative to the upper rail 6.

Accordingly, the shaft member 41, the mass member 43, and the coil spring 50 may be integrally attached to the upper rail 6 as a single unit. An assembly operation of the unlock operation inhibition apparatus 40 may be effectively performed accordingly.

According to the aforementioned embodiment, the restriction portion includes the biasing portion (the coil spring 50) biasing the mass member 43 in a direction opposite from a moving direction of the mass member 43 based on an input of the collision load to inhibit the movement of the mass member 43.

Accordingly, after the mass member 43 moves forward due to the input of the collision load, the mass member 43 may return to the position at which the mass member 43 is inhibited from interfering with the lock lever 22 based on the biasing force of the coil spring 50. Then, in the same way as before the vehicle collision, the lock mechanism 20 may perform the unlock operation after the vehicle collision based on the operation input to the operation lever 30.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
an upper rail supporting a seat at an upper side and including an inner void extending in an extending direction of the upper rail;
a lower rail supporting the upper rail to be movable relative to the lower rail;
a lock mechanism configured to restrict a relative movement of the upper rail relative to the lower rail and including a lock lever, the lock lever being supported by the upper rail and including an engaging portion that moves within the inner void to be engageable and disengageable relative to an engaged portion formed at the lower rail; and
an unlock operation inhibition apparatus including a mass member arranged at the inner void of the upper rail, a moving axis forming member forming a moving axis on which the mass member moves at the inner void along the extending direction of the upper rail, and a restriction portion inhibiting a movement of the mass member on the moving axis, the unlock operation inhibition apparatus restricting the engaging portion from moving to disengage from the engaged portion by the movement of the mass member on the moving axis to a position at which the mass member interferes with the lock lever in a case where a collision load greater than a retraining force specified for the restriction portion is input.

2. The seat slide apparatus according to claim 1, wherein the lock lever is supported by the upper rail in a state where the engaging portion moves within the inner void relative to an operation supporting point, and the mass member makes contact between the operation supporting point and the engaging portion of the lock lever to restrict the engaging portion from moving to disengage from the engaged portion.

3. The seat slide apparatus according to claim 1, wherein the moving axis forming member is a shaft member extending in the extending direction of the upper rail, and the mass member includes a penetration bore into which the shaft member is inserted.

4. The seat slide apparatus according to claim 2, wherein the moving axis forming member forms the moving axis by contacting with the mass member, and a contact surface formed at the mass member spreads in a direction along the moving axis.

5. The seat slide apparatus according to claim 1, wherein the unlock operation inhibition apparatus includes a holding member configured to integrally assemble the mass member, the moving axis forming member, and the restriction portion relative to the upper rail.

6. The seat slide apparatus according to claim 1, wherein the restriction portion includes a biasing portion biasing the mass member in a direction opposite from a moving direction of the mass member based on an input of the collision load to inhibit the movement of the mass member.

\* \* \* \* \*